United States Patent
Yonezawa et al.

(10) Patent No.: US 9,318,972 B2
(45) Date of Patent: Apr. 19, 2016

(54) POWER CIRCUIT

(71) Applicant: FUJITSU LIMITED, Kawasaki-shi, Kanagawa (JP)

(72) Inventors: Yu Yonezawa, Sagamihara (JP); Yoshiyasu Nakashima, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/629,330

(22) Filed: Feb. 23, 2015

(65) Prior Publication Data
US 2015/0256101 A1 Sep. 10, 2015

(30) Foreign Application Priority Data
Mar. 10, 2014 (JP) .................... 2014-046792

(51) Int. Cl.
*H02M 7/217* (2006.01)
*H02M 3/00* (2006.01)

(52) U.S. Cl.
CPC ............... *H02M 7/217* (2013.01); *H02M 3/00* (2013.01)

(58) Field of Classification Search
CPC ........... H02M 7/06; H02M 1/32; H02M 1/36; H02M 7/217; H02M 1/4275; H02H 7/127; H02H 9/001; Y02B 70/126; G05F 1/70; G05F 1/573; G05F 1/5735
USPC .......... 363/50, 52, 84, 89, 125, 126; 323/205, 323/207, 266, 276, 908
See application file for complete search history.

(56) References Cited

U.S. PATENT DOCUMENTS

| | | | | | |
|---|---|---|---|---|---|
| 5,146,399 | A | * | 9/1992 | Gucyski | H02M 1/10 323/222 |
| 5,155,430 | A | * | 10/1992 | Gulczynski | H02M 3/33569 323/224 |
| 5,164,656 | A | * | 11/1992 | Gulczynski | H02M 1/10 323/222 |
| 5,420,780 | A | * | 5/1995 | Bernstein | H02H 9/001 323/908 |
| 5,461,263 | A | * | 10/1995 | Helfrich | H02J 9/062 307/64 |
| 5,568,041 | A | * | 10/1996 | Hesterman | H02M 1/4225 323/207 |
| 6,055,167 | A | * | 4/2000 | Shamkovich | H02M 1/4225 323/300 |
| 2006/0132105 | A1 | * | 6/2006 | Prasad | H02M 1/4225 323/222 |
| 2012/0281327 | A1 | * | 11/2012 | Duan | H02H 1/04 361/93.7 |
| 2013/0135911 | A1 | * | 5/2013 | Lee | H02M 7/04 363/126 |
| 2015/0222178 | A1 | * | 8/2015 | Skinner | H02M 7/06 363/126 |

FOREIGN PATENT DOCUMENTS

JP 09-006440 A 1/1997

* cited by examiner

*Primary Examiner* — Adolf Berhane
(74) *Attorney, Agent, or Firm* — Arent Fox LLP (57) ABSTRACT

A power circuit includes: a rectifying circuit configured to rectify an AC voltage; a capacitor configured to integrate an output current of the rectifying circuit; a field effect transistor connected between the rectifying circuit and the capacitor; and a control circuit configured to supply a first gate voltage to a gate of the field effect transistor when a voltage of the capacitor is lower than a threshold value and supply a second gate voltage to the gate of the field effect transistor when the voltage of the capacitor is higher than the threshold value, wherein a resistance of the field effect transistor when the first gate voltage is supplied is higher than a resistance of the field effect transistor when the second gate voltage is supplied.

10 Claims, 6 Drawing Sheets

POWER CIRCUIT

CROSS-REFERENCE TO RELATED APPLICATION

This application is based upon and claims the benefit of priority from the prior Japanese Patent Application No. 2014-046792 filed on Mar. 10, 2014, the entire contents of which are incorporated herein by reference.

FIELD

The embodiments discussed herein are related to a power circuit.

BACKGROUND

An inrush current prevention circuit has been known in which an FET is serially connected to an input line of a switching power supply and a gate voltage of the FET is controlled by a charging voltage of a capacitor to suppress the inrush current when a power supply is connected. See, for example, Japanese Laid-Open Patent Publication No. H9-6440. A current supply circuit supplies a charging current to the capacitor when the power supply is connected. A switching element is connected in parallel to the capacitor. A charging/discharging control circuit turns OFF the switching element when the power supply is connected, to charge the capacitor by a current from the current supply circuit. The charging/discharging control circuit turns ON the switching element when the power supply is disconnected to discharge the charges of the capacitor.

Related techniques are disclosed in, for example, Japanese Laid-Open Patent Publication No. H9-6440.

An AC-DC power circuit converts an AC voltage into a DC voltage to supply a DC power voltage. Immediately after the AC power is supplied, an excessive current may flow due to an inrush current, thereby lowering a voltage of an AC power line which causes an adverse effect.

The present invention has been made in an effort to provide a power device which prevents an inrush current with high reliability and/or high efficiency immediately after an AC power is supplied.

SUMMARY

A power circuit includes a rectifying circuit which rectifies an AC voltage; a capacitor which integrates an output current of the rectifying circuit; a field effect transistor which is connected between the rectifying circuit and the capacitor; and a control circuit which supplies a first gate voltage to a gate of the field effect transistor when a voltage of the capacitor is lower than a threshold value and supplies a second gate voltage to the gate of the field effect transistor when the voltage of the capacitor is higher than the threshold value, in which a resistance of the field effect transistor when the first gate voltage is supplied is higher than a resistance of the field effect transistor when the second gate voltage is supplied.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

DESCRIPTION OF EMBODIMENTS

Figure 1:
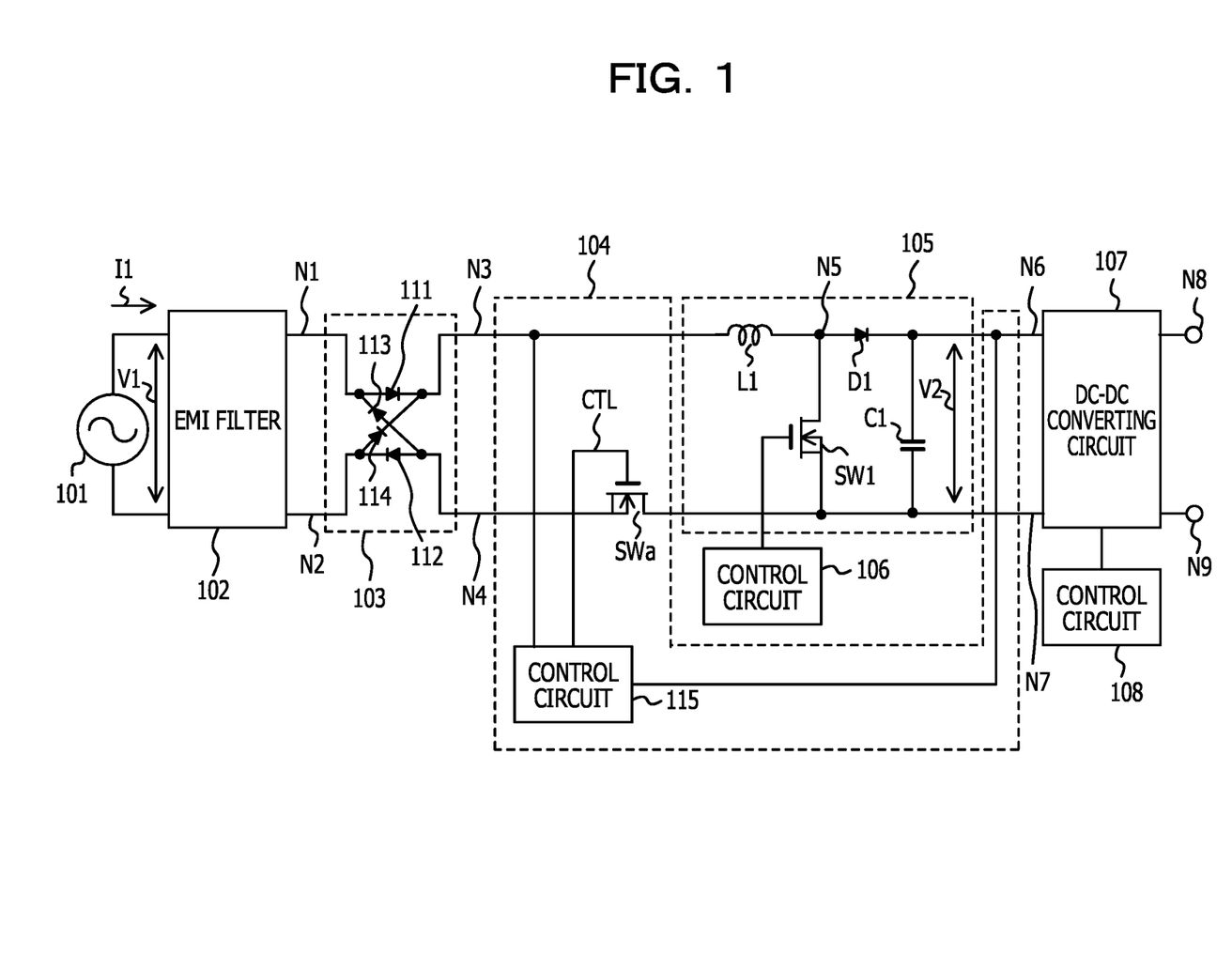
FIG. 1 is a view illustrating an exemplary configuration of an alternative current (AC)-direct current (DC) power circuit according to an embodiment.
Figure 2:
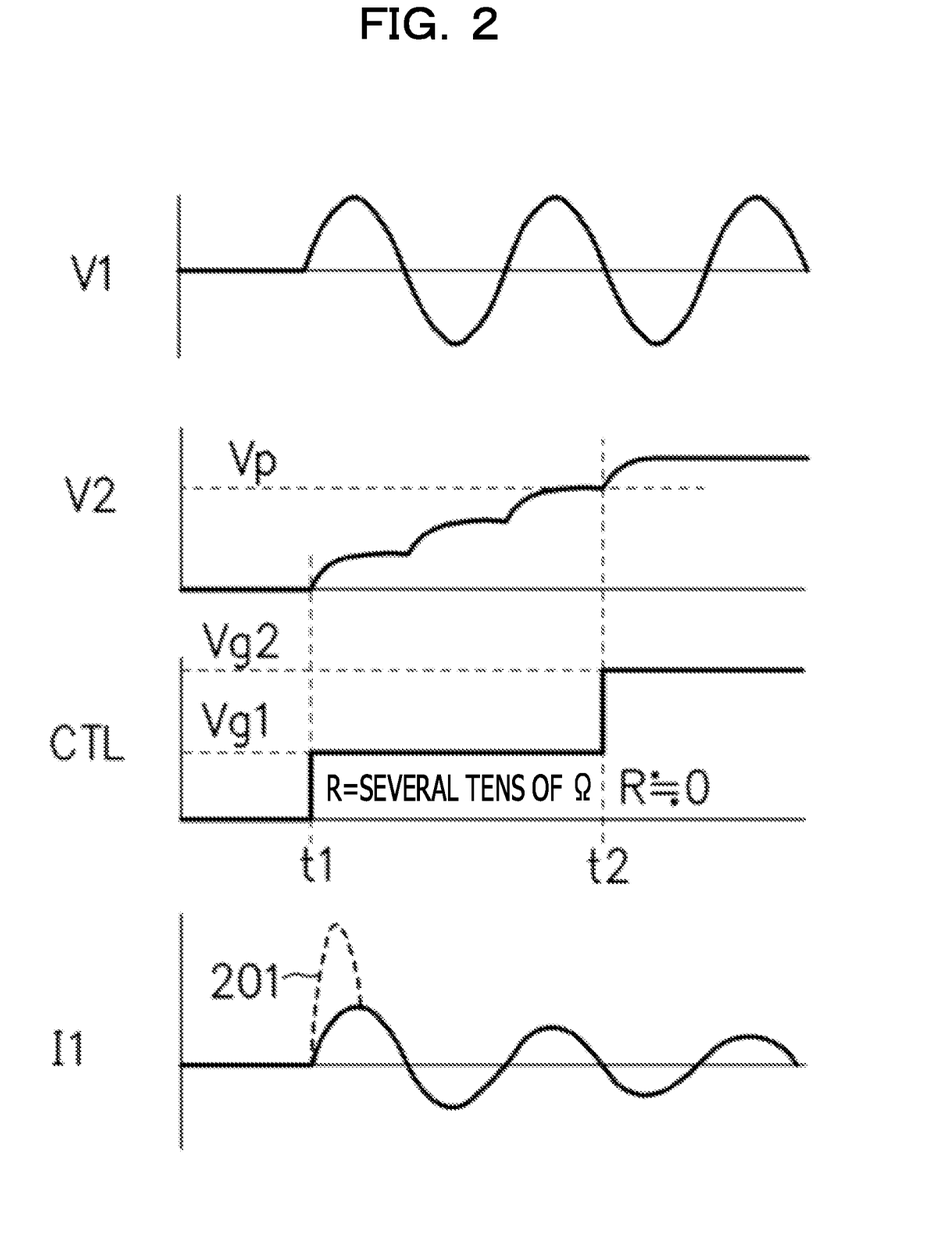
FIG. 2 is a timing chart illustrating a control method of the AC-DC power circuit of FIG. 1.

FIG. 1 is a view illustrating an exemplary configuration of an alternative current (AC)-direct current (DC) power circuit according to an embodiment, and FIG. 2 is a timing chart illustrating a control method of the AC-DC power circuit of FIG. 1. The AC-DC power circuit includes an AC power supply 101, an electromagnetic interference (EMI) filter 102, a rectifying circuit 103, an inrush current prevention circuit 104, a power factor correction (PFC) circuit 105, a control circuit 106, a DC-DC converting circuit 107, and a control circuit 108. The rectifying circuit 103 includes diodes 111 to 114. The inrush current prevention circuit 104 includes an n-channel field effect transistor (FET) SWa and a control circuit 115. The power factor correction circuit 105 includes an inductor L, an n-channel field effect transistor (FET) (switch) SW1, a diode D1, and a capacitor C1.

The AC power supply 101 is a commercial power supply and supplies an AC voltage V1. The AC voltage V1 ranges from, for example, 100 to 240 V. An AC current I1 is an output current of the AC power supply 101. The EMI filter 102 is a low pass filter which is connected between the AC power supply 101 and the rectifying circuit 103 to low-pass filter the AC voltage V1, thereby removing a noise such as a switching noise. The EMI filter 102 is connected to a front stage of the rectifying circuit 103 to output a voltage between nodes N1 and N2. The rectifying circuit 103 rectifies an AC voltage output by the EMI filter 102 to output the rectified voltage between a first output node N3 and a second output node N4. An anode of the diode 111 is connected to the node N1 and a cathode thereof is connected to the node N3. An anode of the diode 112 is connected to the node N4 and a cathode thereof is connected to the node N2. An anode of the diode 113 is connected to the node N4 and a cathode thereof is connected to the node N1. An anode of the diode 114 is connected to the node N2 and a cathode thereof is connected to the node N3. The rectifying circuit 103 carries out a full-wave rectification of the AC voltage between the nodes N1 and N2 to output the full-wave rectified voltage between the nodes N3 and N4.

As the FET SWa and SW1, a high electron mobility transistor (HEMT) formed of gallium nitride (GaN) is desirable, but an MOS field effect transistor is also available. The HEMT has advantages in view of high voltage resistance and high switching. A gate of the FET SWa is connected to the control circuit 115, a source thereof is connected to the node N4, and a drain thereof is connected to a node N7. The inductor L1 is connected between the nodes N3 and N5. A gate of the FET SW1 is connected to the control circuit 106, a source thereof is connected to the node N7, and a drain thereof is connected to the node N5. An anode of the diode D1 is connected to the node N5 and a cathode thereof is connected to the node N6. The capacitor C1 is connected between the nodes N6 and N7. A voltage V2 is a voltage between the nodes N6 and N7. The control circuit 115 inputs a voltage of the node N3 and the voltage V2 of the node N6 and supplies a gate voltage CTL to the gate of the FET SWa.

The capacitor C1 integrates an output current of the rectifying circuit 103 and outputs the voltage V2. The control circuit 106 outputs a high frequency pulse voltage with respect to a frequency of the AC voltage V1 to the gate of the FET SW1. Accordingly, the FET SW1 is repeatedly turned ON and OFF at a short period. The PFC circuit 105 outputs a smoothed voltage V2 which is obtained by low-pass filtering the output voltage of the rectifying circuit 103. Then, the voltage V2 becomes a DC voltage.

For example, when the AC voltage V1 is 240 V (an effective value), a peak voltage of the AC voltage V1 is $240 \times \sqrt{2} = 375$ V. In this case, due to a transient phenomenon of the PFC circuit 105, the voltage V2 becomes a DC voltage of approximately 400 V.

In the meantime, the FET SW1 and the diode D1 may be omitted. In this case, the nodes N5 and N6 are short-circuited. The size of the PFC circuit 105 may be reduced by providing the FET SW1 and the diode D1.

The DC-DC converting circuit 107 inputs the voltage V2 of the capacitor C1, shifts a level of the voltage V2, and outputs the shifted DC voltage between nodes N8 and N9 under the control of the control circuit 108. For example, the DC-DC converting circuit 107 drops the DC voltage V2 of 400 V to output a DC voltage of 12 V. In this case, the AC-DC power circuit may convert the AC voltage V1 of 240 V into a DC voltage of 12 V.

Figure 3:
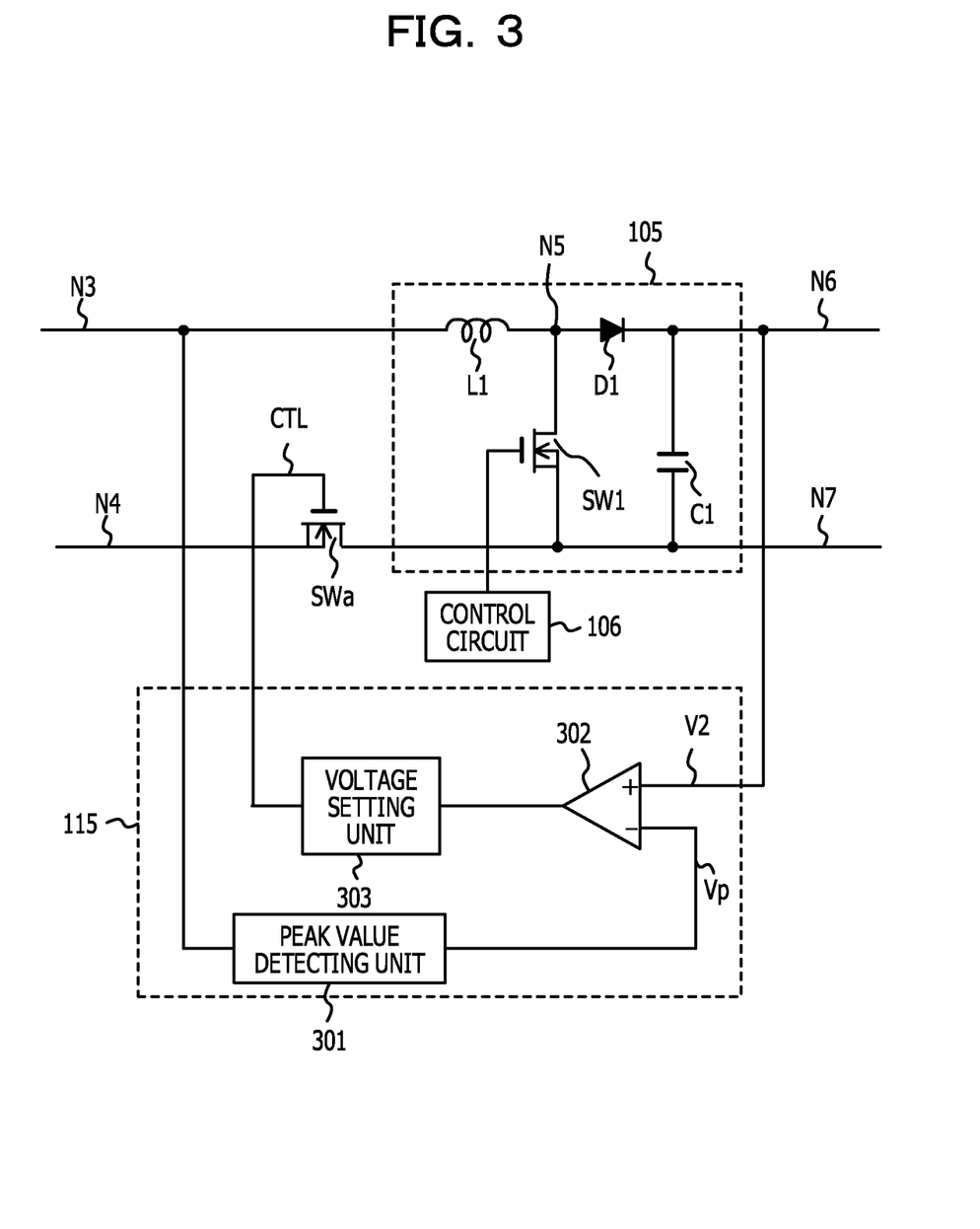
FIG. 3 is a view illustrating an exemplary configuration of a control circuit of FIG. 1.

FIG. 3 is a view illustrating an exemplary configuration of the control circuit 115 of FIG. 1. The control circuit 115 includes a peak value detecting unit 301, a comparing unit 302, and a voltage setting unit 303. The peak value detecting unit 301 detects a peak voltage Vp of the voltage of the node N3 and outputs the peak voltage Vp to the comparing unit 302. For example, when the AC voltage V1 is 240 V, the peak voltage Vp is 375 V. The comparing unit 302 compares the voltage V2 of the node N6 to the peak voltage Vp. When the voltage V2 is higher than the peak voltage (threshold value) Vp, the comparing unit 302 outputs a high level and when the voltage V2 is lower than the peak voltage (threshold value) Vp, the comparing unit 302 outputs a low level. When the comparing unit 302 outputs the low level, the voltage setting unit 303 supplies a first gate voltage Vg1 to the gate of the FET SWa as a gate voltage CTL. When the comparing unit 302 outputs the high level, the voltage setting unit 303 supplies a second gate voltage Vg2 to the gate of the FET SWa as a gate voltage CTL.

The first gate voltage Vg1 is higher than 0 V and lower than the second gate voltage Vg2. When the second gate voltage Vg2 is supplied to the gate of the FET SWa, the FET SWa is completely turned on and a resistance R between the source and the drain of the FET SWa is approximately 0Ω. On the contrary, when the first gate voltage Vg1 is supplied to the gate of the FET SWa, the FET SWa is incompletely turned on and the resistance R between the source and the drain of the FET SWa is several tens Ω. A resistance R of the FET SWa when the first gate voltage Vg1 is supplied is higher than a resistance R of the FET SWa when the second gate voltage Vg2 is supplied.

Next, referring to FIG. 2, a control method of the AC-DC power circuit of FIG. 1 will be explained. Prior to a time t1, an AC power supply 101 is not connected to an AC-DC power circuit. Voltages V1, V2, and CTL are 0 V and a current I1 is 0 A. Since the gate voltage CTL is 0 V, the FET SWa is turned OFF.

Next, at the time t1, an AC power is supplied, so that the AC power supply 101 is connected to the AC-DC power circuit. The AC power supply 101 starts to supply the AC voltage V1. When an inrush current prevention circuit 104 is not provided, immediately after the AC power supplying time t1, an excessive inrush current 201 flows as a current I1, so that the AC voltage V1 is lowered, which causes an adverse effect. This is because the inrush current flows immediately after the AC power supplying time t1 to charge the capacitor C1. In the embodiment, an inrush current prevention circuit 104 is provided. The peak value detecting unit 301 detects the peak voltage Vp. When the AC voltage V1 is 240 V, the peak voltage Vp is 375 V. The capacitor C1 integrates an output current of the rectifying circuit 103 to output the voltage V2. The voltage V2 is gradually increased. During the time t1 to t2, since the voltage V2 is lower than the peak voltage (threshold value) Vp, the comparing unit 302 outputs a low level. Then, the voltage setting unit 303 supplies the first gate voltage Vg1 to the gate of the FET SWa as a gate voltage CTL. Therefore, the resistance R of the FET SWa is several tens Ω. As a result, in the current I1, there is no inrush current 201 and the inrush current 201 is suppressed to be a small AC current. Therefore, the inrush current 201 is prevented immediately after the AC power is supplied, thereby preventing the adverse effect.

At the time t2, the voltage V2 becomes higher than the peak voltage (threshold value) Vp and the comparing unit 302 outputs a high level. Then, the voltage setting unit 303 supplies the second gate voltage Vg2 to the gate of the FET SWa as a gate voltage CTL. Therefore, the resistance R of the FET SWa becomes approximately 0Ω, so that unnecessary power loss may be removed. After the time t2, the inrush current 201 is not generated, so that the resistance R of the FET SWa may be approximately 0Ω. Thereafter, the DC voltage V2 is converged to a predetermined value of approximately 400 V.

As described above, immediately after the AC power supplying time t1, the resistance R of the FET SWa is high, so that the inrush current 201 may be prevented.

In the meantime, a relay circuit is considered to be provided instead of the FET SWa. However, since the relay circuit is maintained to be closed while the AC-DC power circuit supplies a DC voltage, coil driving power (several hundreds mW) of the relay circuit is continuously consumed, so that the power consumption is increased. Further, in the case of an operation with a low open/close frequency of the relay circuit, the relay circuit may not be opened/closed due to the welding of an electrode of the relay circuit or coupling of electrode materials, so that the reliability of the relay circuit is lowered. In the embodiment, since the FET SWa is used without using the relay circuit, the power consumption may be lowered and thus the reliability may be improved.

The FET SWa is considered to be provided at the front stage of the rectifying circuit 103. However, an AC (bidirectional current) flows at the node N1 or N2 at the front stage of the rectifying circuit 103. Since an FET for high power is a uni-directional switch having a parasitic diode, two FETs corresponding to a bidirectional switch are required at the front stage of the rectifying circuit 103. As compared with one FET, a resistance of two FETs is doubled, so that energization loss is increased. In the embodiment, the FET SWa is provided at a rear stage of the rectifying circuit 103, so that one FET SW1 is provided instead of two FETs for a bidirectional current, thereby reducing the energization loss and improving the efficiency.

Figure 4A:
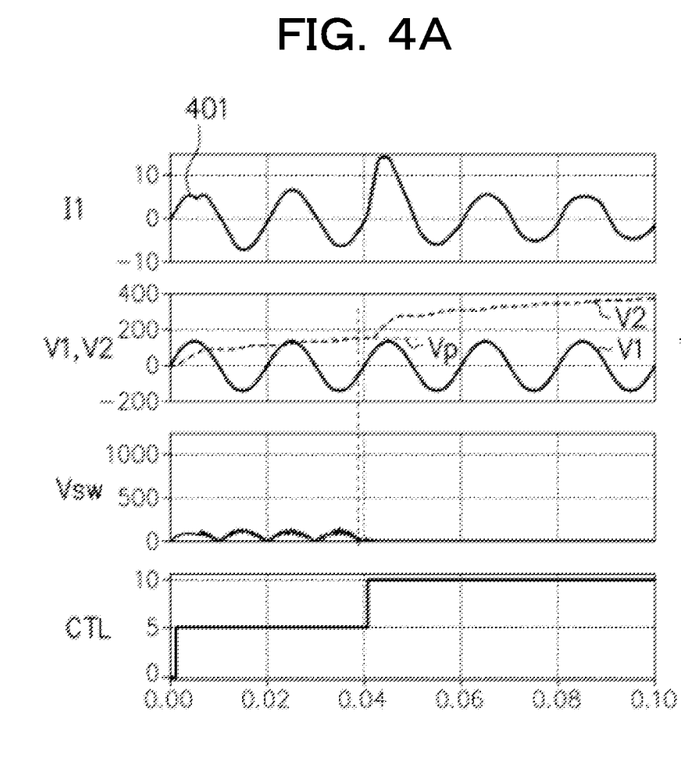
FIGS. 4A and 4B are timing charts illustrating a simulation result of the AC-DC power circuit of FIG. 1.
Figure 4B:
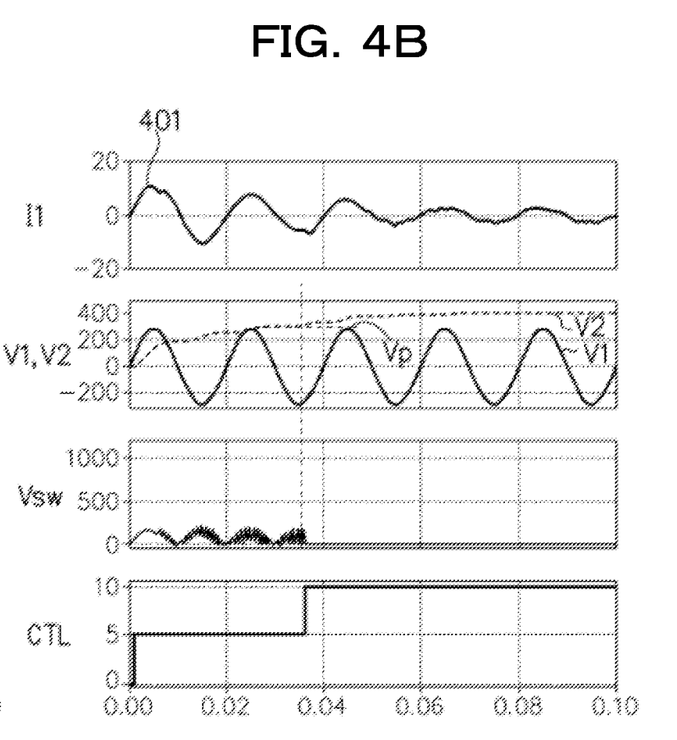

FIGS. 4A and 4B are timing charts illustrating a simulation result of the AC-DC power circuit of FIG. 1. FIG. 4A is a timing chart when the AC voltage V1 is 100 V and FIG. 4B is a timing chart when the AC voltage V1 is 200 V. For example, a threshold voltage Vth of the FET SWa is 5 V. In the gate voltage CTL, the first gate voltage Vg1 is 5 V which is the same as the threshold voltage Vth. The second gate voltage Vg2 is 10 V, which is higher than the threshold voltage Vth.

In a period during which the voltage V2 is lower than the peak voltage (threshold value) Vp, the gate voltage CTL becomes the first gate voltage Vg1 (=5 V). In a period during which the voltage V2 is higher than the peak voltage (threshold value) Vp, the gate voltage CTL becomes the second gate voltage Vg2 (=10 V). Therefore, in the AC current I1, in the current 401, the inrush current is suppressed immediately after the AC power is supplied.

The voltage Vsw is a voltage between the source and the drain of the FET SWa. Since the voltage Vsw is a uni-directional voltage, in the inrush current prevention circuit 104, there is no need to provide two FETs for a bidirectional current and one FET SWa is provided. It can be confirmed that when one FET SWa is provided, the inrush current is suppressed.

In the case of an AC voltage V1 of 100 V (effective value) of FIG. 4A, the peak value detecting unit 301 detects the peak voltage (threshold value) Vp of 100×√2=144 V. In a period during which the voltage V2 is lower than the peak voltage Vp of 144 V, the gate voltage CTL becomes the first gate voltage Vg1 (=5 V). In a period during which the voltage V2 is higher than the peak voltage Vp of 144 V, the gate voltage CTL becomes the second gate voltage Vg2 (=10 V).

In the case of an AC voltage V1 of 200 V (effective value) of FIG. 4B, the peak value detecting unit 301 detects the peak voltage (threshold value) Vp of 200×√2=288 V. In a period during which the voltage V2 is lower than the peak voltage Vp of 288 V, the gate voltage CTL becomes the first gate voltage Vg1 (=5 V). In a period during which the voltage V2 is higher than the peak voltage Vp of 288 V, the gate voltage CTL becomes the second gate voltage Vg2 (=10 V).

When the AC voltage V1 is 100 V, the peak voltage (threshold value) VP is 144 V and when the AC voltage V1 is 200 V, the peak voltage (threshold value) Vp is 288 V. It can be confirmed that when the AC voltage V1 is changed, the peak voltage (threshold value) Vp is also changed.

Next, a setting method of the first gate voltage Vg1 will be described. Since a voltage V2 of the capacitor C1 is 0 V immediately after the AC power is supplied, a serial circuit of a resistance R of the FET SWa and the AC power supply 101 is formed. The resistance R of the FET SWa is represented by R=V1/Ip. Here, the voltage V1 is an AC voltage of the AC power supply 101. The current Ip is a peak value of a current I1 to be set. Using a data sheet of the FET SWa, a relationship between the gate voltage CTL and the resistance R is searched to determine the first gate voltage Vg1.

Next, a setting method of a voltage resistance of the FET SWa will be described. A maximum voltage which is applied at both ends of the FET SWa becomes equal to the peak value of the AC voltage V1 of the AC power supply 101 and is represented by V1×√2. The voltage resistance of the FET SWa may be set with the maximum voltage as a voltage resistance.

Figure 5:
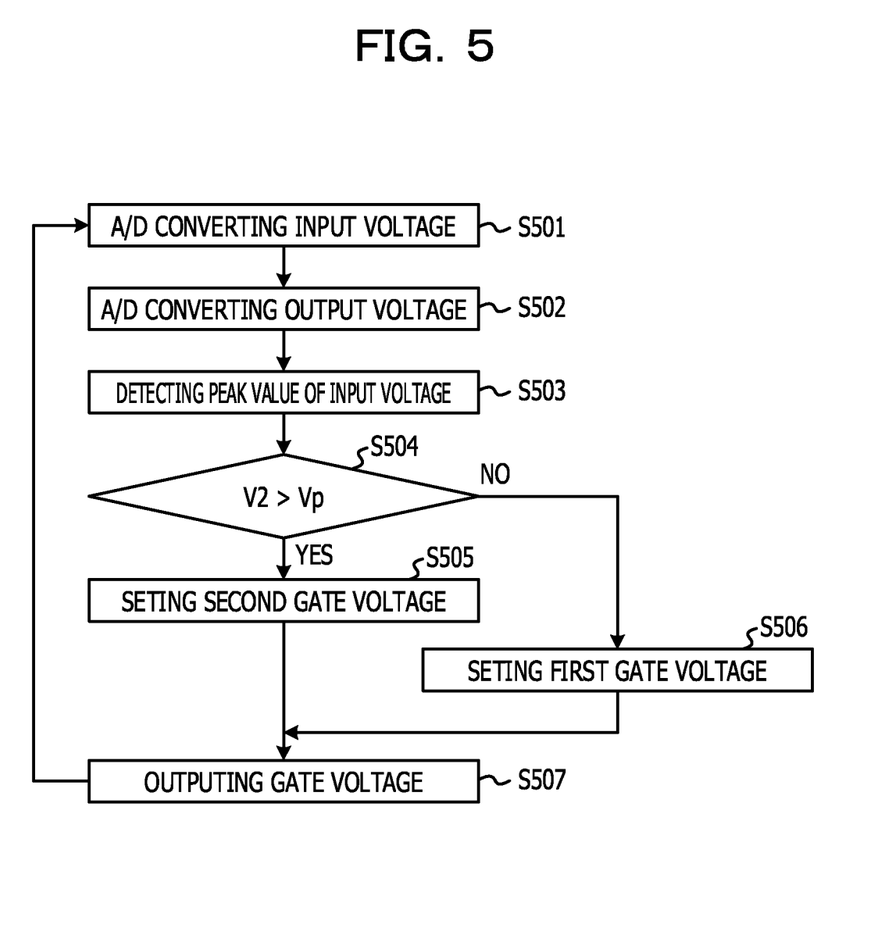
FIG. 5 is a flowchart illustrating a processing method of a control circuit.

FIG. 5 is a flowchart illustrating a processing method of the control circuit 115. An example in which the control circuit 115 is a microcomputer will be described. The microcomputer, as the control circuit 115, performs the processing of a flowchart of FIG. 5.

First, at step S501, the microcomputer converts the voltage of the node N3 from an analog signal into a digital signal. The voltage of the node N3 is an input voltage of the PFC circuit 105.

Next, at step S502, the microcomputer converts the voltage V2 of the node N6 from an analog signal into a digital signal. The voltage V2 of the node N6 is an output voltage of the PFC circuit 105.

Next, at step S503, the microcomputer detects the peak voltage Vp of the voltage of the node N3 correspondingly to the peak value detecting unit 301.

Next, at step S504, the microcomputer determines whether the voltage V2 is higher than the peak voltage Vp correspondingly to the comparing unit 302. When the voltage V2 is higher than the peak voltage Vp, the microcomputer proceeds the processing to step S505 and when the voltage V2 is equal to or lower than the peak voltage Vp, the microcomputer proceeds the processing to step S506.

At step S505, the microcomputer sets the second gate voltage Vg2 as the gate voltage CTL in order to make the resistance R of the FET SWa become approximately 0Ω, and proceeds the processing to step S507.

At step S506, the microcomputer sets the first gate voltage Vg1 as the gate voltage CTL in order to make the resistance R of the FET SWa become several tens Ω, and proceeds the processing to step S507.

At step S507, the microcomputer outputs the gate voltage CTL to the gate of the FET SWa and returns the processing to step S501.

Figure 6:
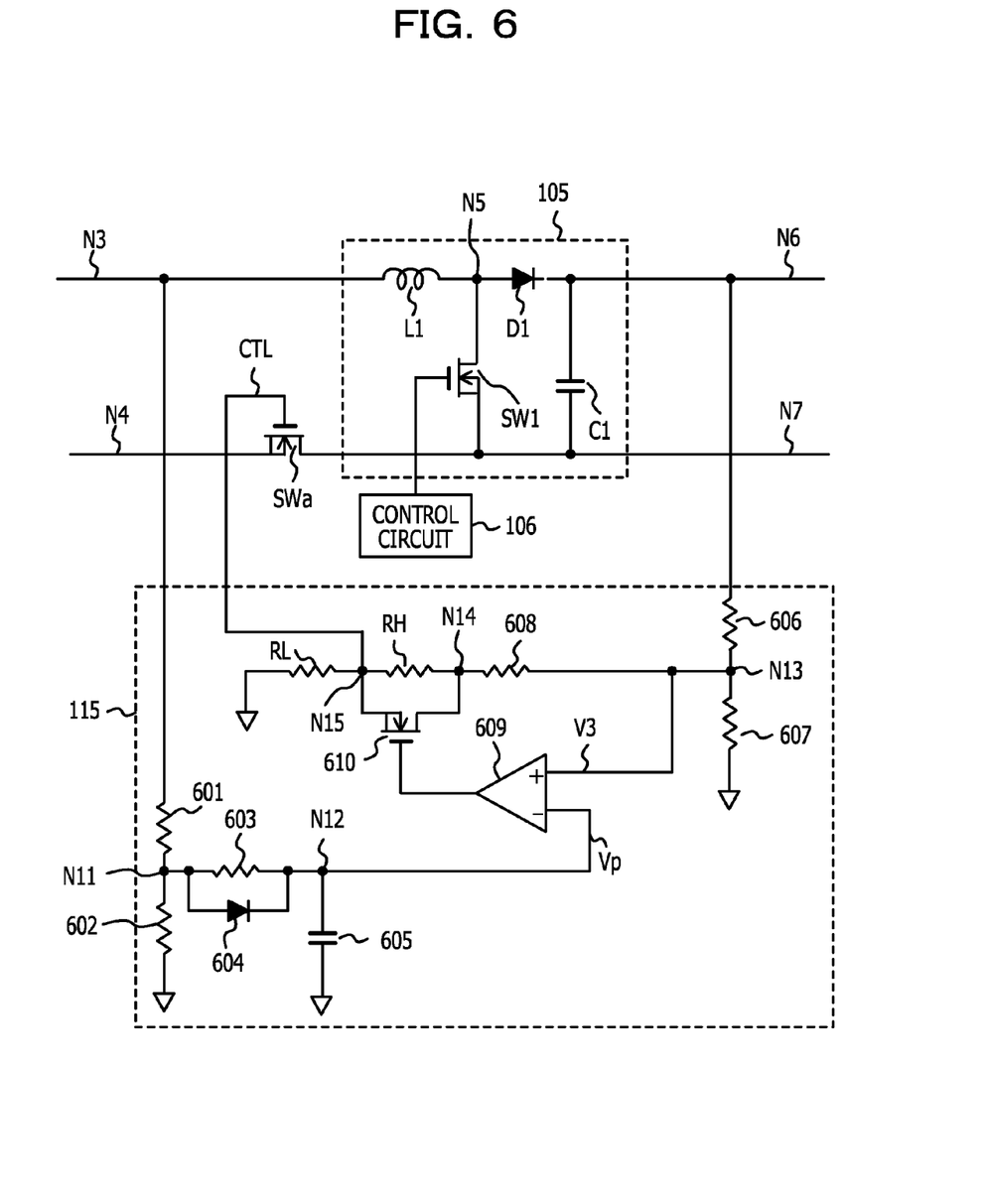
FIG. 6 is a view illustrating another exemplary configuration of a control circuit.

FIG. 6 is a view illustrating another exemplary configuration of the control circuit 115. An example in which the control circuit 115 is an analog circuit will be described. A resistor 601 is connected between nodes N3 and N11. A resistor 602 is connected between a node N11 and a reference potential node (for example, a ground potential node). A resistor 603 is connected between nodes N11 and N12. An anode of the diode 604 is connected to the node N11 and a cathode thereof is connected to the node N12. A capacitor 605 is connected between the node N12 and the reference potential node. A resistor 606 is connected between nodes N6 and N13. A resistor 607 is connected between the node N13 and the reference potential node. A positive input terminal of a comparator 609 is connected to the node N13 and a negative input terminal thereof is connected to the node N12. A gate of an n-channel FET 610 is connected to the output terminal of the comparator 609, a source thereof is connected to a node N15, and a drain thereof is connected to a node N14. A resistor 608 is connected between the nodes N13 and N14. A resistor RH is connected between the nodes N14 and N15. A resistor RL is connected between the node N15 and the reference potential node. The node N15 is connected to the gate of the FET SWa.

The resistors 601 to 603, the diode 604, and the capacitor 605 correspond to the peak value detecting unit 301 of FIG. 3. The node N11 outputs a voltage obtained by dividing the voltage of the node N3 by the resistors 601 and 602. Since the diode 604 passes only a current which is directed from the node N11 to the node N12, the capacitor 605 maintains the peak voltage of the output voltage of the node N11 and outputs the peak voltage Vp to the node N12. When the AC power supply 101 is cut off, the charges of the capacitor C1 are discharged to the reference potential node via the resistors 602 and 603.

The resistors 606 and 607 and the comparator 609 corresponds to the comparing unit 302 of FIG. 3. The node N13 outputs a voltage V3 obtained by dividing the voltage of the node N6 by the resistors 606 and 607. When the voltage V3 is higher than the peak voltage (threshold value) Vp, the comparator 609 outputs a high level and when the voltage V3 is lower than the peak voltage (threshold value) Vp, the comparator 609 outputs a low level.

The resistors 608, RL, RH and the FET 610 correspond to the voltage setting unit 303 of FIG. 3. When the comparator 609 outputs the high level, the FET 610 is turned ON and the node N15 outputs the second gate voltage Vg2 to the gate of the FET SWa as the gate voltage CTL. When the comparator 609 outputs the low level, the FET 610 is turned OFF and the node N15 outputs the first gate voltage Vg1 to the gate of the FET SWa as the gate voltage CTL. The second gate voltage Vg2 is higher than the first gate voltage Vg1.

As described above, in FIG. 3, the peak voltage (threshold value) Vp is a peak voltage of the output node N3 of the rectifying circuit 103. On the contrary, in FIG. 6, the peak voltage (threshold value) Vp is a peak voltage of the node N11 obtained by dividing a voltage of the output node N3 of the rectifying circuit 103. The peak voltage (threshold value) Vp may be set based on the voltage of the output node N3 of the rectifying circuit 103.

In the meantime, the FET SWa may be provided between the node N3 and the node N5. Further, the inductor L1 may be provided between the nodes N4 and N7. Furthermore, the diode D1 may be connected to the source of the FET SW1. In this case, the anode of the diode D1 is connected to a lower electrode of the capacitor C1 of FIG. 1 and the cathode is connected to the source of the FET SW1.

The above-described embodiments only describe specific examples to carry out the present invention but the technical scope of the present invention is not interpreted to be limited thereto. That is, the present invention may be carried out by various types without departing from the technical spirit or a major feature.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a illustrating of the superiority and inferiority of the invention. Although the embodiments of the present invention have been described in detail, it should be understood that the various changes, substitutions, and alterations could be made hereto without departing from the spirit and scope of the invention.

What is claimed is:

1. A power circuit, comprising:
a rectifying circuit configured to rectify an AC voltage;
a capacitor configured to integrate an output current of the rectifying circuit;
a field effect transistor connected between the rectifying circuit and the capacitor; and
a control circuit configured to supply a first gate voltage to a gate of the field effect transistor when a voltage of the capacitor is lower than a threshold value and supply a second gate voltage to the gate of the field effect transistor when the voltage of the capacitor is higher than the threshold value,
wherein a resistance of the field effect transistor when the first gate voltage is supplied is higher than a resistance of the field effect transistor when the second gate voltage is supplied; and
wherein the first gate voltage and the second gate voltage are values greater than zero.

2. The power circuit according to claim 1, wherein the control circuit sets the threshold value based on an output voltage of the rectifying circuit.

3. The power circuit according to claim 1, wherein the control circuit detects a peak value of an output voltage of the rectifying circuit to set the threshold value based on the peak value.

4. The power circuit according to claim 1, further comprising:
an inductor connected between the rectifying circuit and the capacitor.

5. The power circuit according to claim 1, wherein the rectifying circuit includes a first output node and a second output node, the capacitor is connected between the first output node and the second output node, and the field effect transistor is connected between the first output node and the capacitor or between the second output node and the capacitor.

6. The power circuit according to claim 5, further comprising:
an inductor which is connected between the first output node and the capacitor or between the second output node and the capacitor.

7. The power circuit according to claim 6, further comprising:
a switch connected in parallel to the capacitor; and
a diode connected between the switch and the capacitor.

8. The power circuit according to claim 1, further comprising:
a low pass filter connected at a front stage of the rectifying circuit.

9. The power circuit according to claim 1, further comprising:
a DC-DC converting circuit configured to input a voltage of the capacitor and shift a level of the voltage of the capacitor.

10. A power circuit, comprising:
a rectifying circuit configured to rectify an AC voltage;
a capacitor configured to integrate an output current of the rectifying circuit;
an inductor connected between the rectifying circuit and the capacitor;
a field effect transistor connected between the rectifying circuit and the inductor; and
a control circuit configured to supply a first gate voltage to a gate of the field effect transistor when a voltage of the capacitor is lower than a threshold value and supply a second gate voltage to the gate of the field effect transistor when the voltage of the capacitor is higher than the threshold value,
wherein a resistance of the field effect transistor when the first gate voltage is supplied is higher than a resistance of the field effect transistor when the second gate voltage is supplied.

* * * * *